United States Patent
Chang

(12) 
(10) Patent No.: US 6,213,048 B1
(45) Date of Patent: Apr. 10, 2001

(54) ELECTROLIER FLAG

(76) Inventor: Chih-Chen Chang, No. 32, Kuang Hua South Street, Hsinchu (TW)

( * ) Notice: Subject to any disclaimer, the term of this patent is extended or adjusted under 35 U.S.C. 154(b) by 0 days.

(21) Appl. No.: 09/223,800

(22) Filed: Dec. 31, 1998

(51) Int. Cl.[7] .............................. G09F 17/00; G09F 13/18; F21V 21/008
(52) U.S. Cl. .................... 116/173; 116/202; 116/DIG. 5; 40/546; 362/391
(58) Field of Search .................... 116/173, 174, 116/202, DIG. 5; 362/249, 252, 391; 40/546, 547, 564, 604; 428/7, 11

(56) References Cited

U.S. PATENT DOCUMENTS

| | | | |
|---|---|---|---|
| 2,688,303 | * | 9/1954 | Leander ................................ 116/173 |
| 3,164,801 | * | 1/1965 | Nicholl ................................. 340/949 |
| 4,110,818 | * | 8/1978 | Hempsey .............................. 362/493 |
| 4,627,278 | * | 12/1986 | Soto ................................. 73/170.06 |
| 4,733,488 | * | 3/1988 | Yokoyama et al. ..................... 40/544 |
| 4,833,443 | * | 5/1989 | Siew .................................... 340/473 |
| 5,477,437 | * | 12/1995 | Lach .................................... 362/252 |
| 5,519,595 | * | 5/1996 | Wang ................................... 362/234 |
| 5,576,078 | * | 11/1996 | Schatz .................................... 428/13 |
| 5,829,865 | * | 11/1998 | Ahroni ................................. 362/226 |
| 5,860,731 | * | 1/1999 | Martinez ............................. 362/252 |
| 5,988,100 | * | 11/1999 | Schmitt ................................. 116/173 |

* cited by examiner

*Primary Examiner*—Andrew H. Hirshfeld
*Assistant Examiner*—R. Alexander Smith
(74) *Attorney, Agent, or Firm*—Rosenberg, Klein & Lee

(57) ABSTRACT

An electrolier flag is provided that includes a lamp box made from transparent material that snaps on to a lamp-holder so that the bulb is enclosed therein. The lamp box condenses the light rays on the inside of the lamp box, and by the conductivity of material, the light rays are conduced into the banner that is coupled to the light box, so that the banner emits light.

2 Claims, 5 Drawing Sheets

ELECTROLIER FLAG

BACKGROUND OF THE INVENTION

1. Field of the Invention

The present invention relates to an electrolier flag, and more particularly to an adornment flag that is able to emit light by itself for advertising and decorating.

2. Description of the Prior Art

The common advertising board or notice board on the inside of the retail establishments or the outside of a house or building appear as a rectangular box attached on the wall, without much change over a long time period. Because the flag type of advertisement has not attracted more consumer's attention, the commercial value of that advertising has greatly decreased. On the other hand, the advertising boards are limited to being attached on the outside of an enclosure's wall, or the entrance of a retail establishment, but it can not be located within the retail establishment.

OBJECTS AND SUMMARY OF THE INVENTION

In accordance with the shortcomings of the prior art, it is therefore a main object of the present invention to provide an electrolier flag that can emit light by itself, for making an advertising board more eye-catching, to decorate the inside wall of a building, and improving the commercial value of advertising.

For achieving these objectives, the present invention provides a lamp box made from transparent material that snaps on a lamp-holder, so as to hold the whole bulb and the base on the inside thereof, so that the light rays are directed into the inside of the lamp box. By means of the optical conductivity of the transparent material, the light rays are conduced into the banner to make it emit light.

The present invention employs a lamp-holder coupled to a parallel cable and holding a bulb therein, and a lamp box formed by a pair of complementary hollow tube halves. A transparent banner extends from the connecting area of the hollow tube halves. There is a notch formed on the edge of the open side of each hollow tube half for locking on the lamp-holder, so that the bulb can be held into the lamp box. In another embodiment, the lamp box is attached to the parallel cable instead of the lamp-holder. The parallel cable passes through cooperating slots formed in both ends of the two hollow tube halves, as the lamp box encloses the bulb.

DETAILED DESCRIPTION OF PREFERRED EMBODIMENTS

Figure 1:
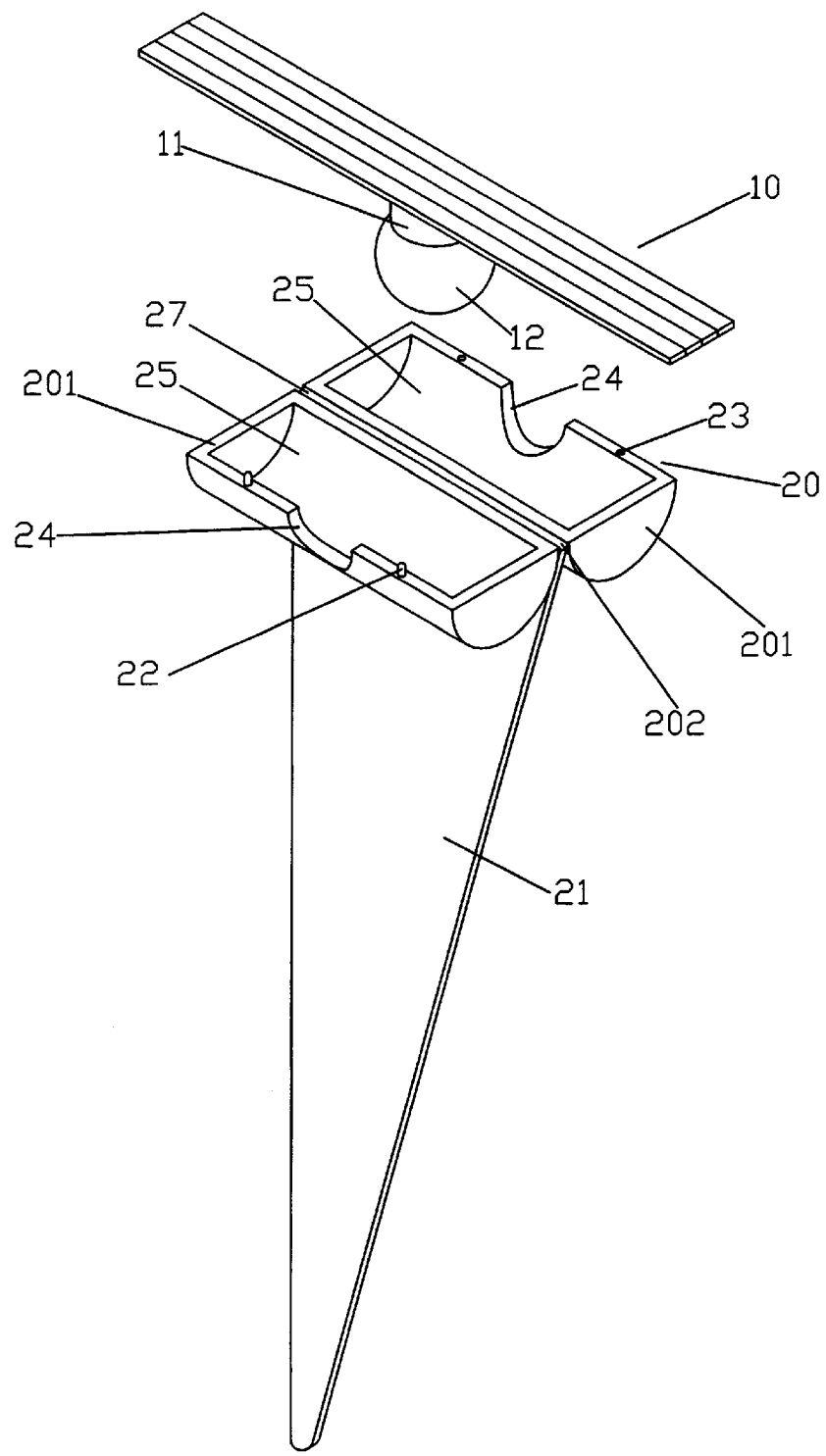
FIG. 1 is an exploded view of the present invention.
Figure 2:
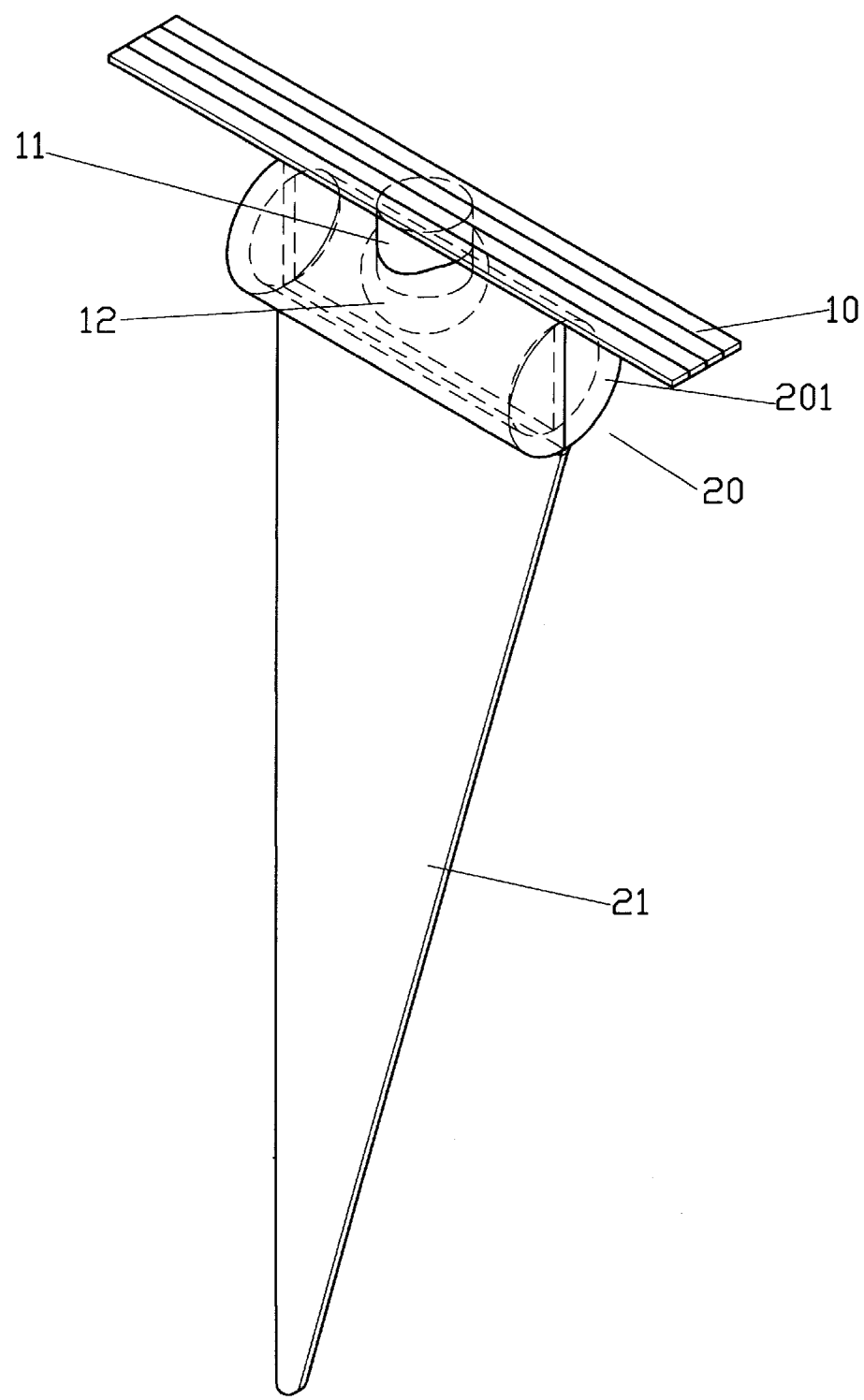
FIG. 2 is a perspective view of the present invention.
Figure 5:
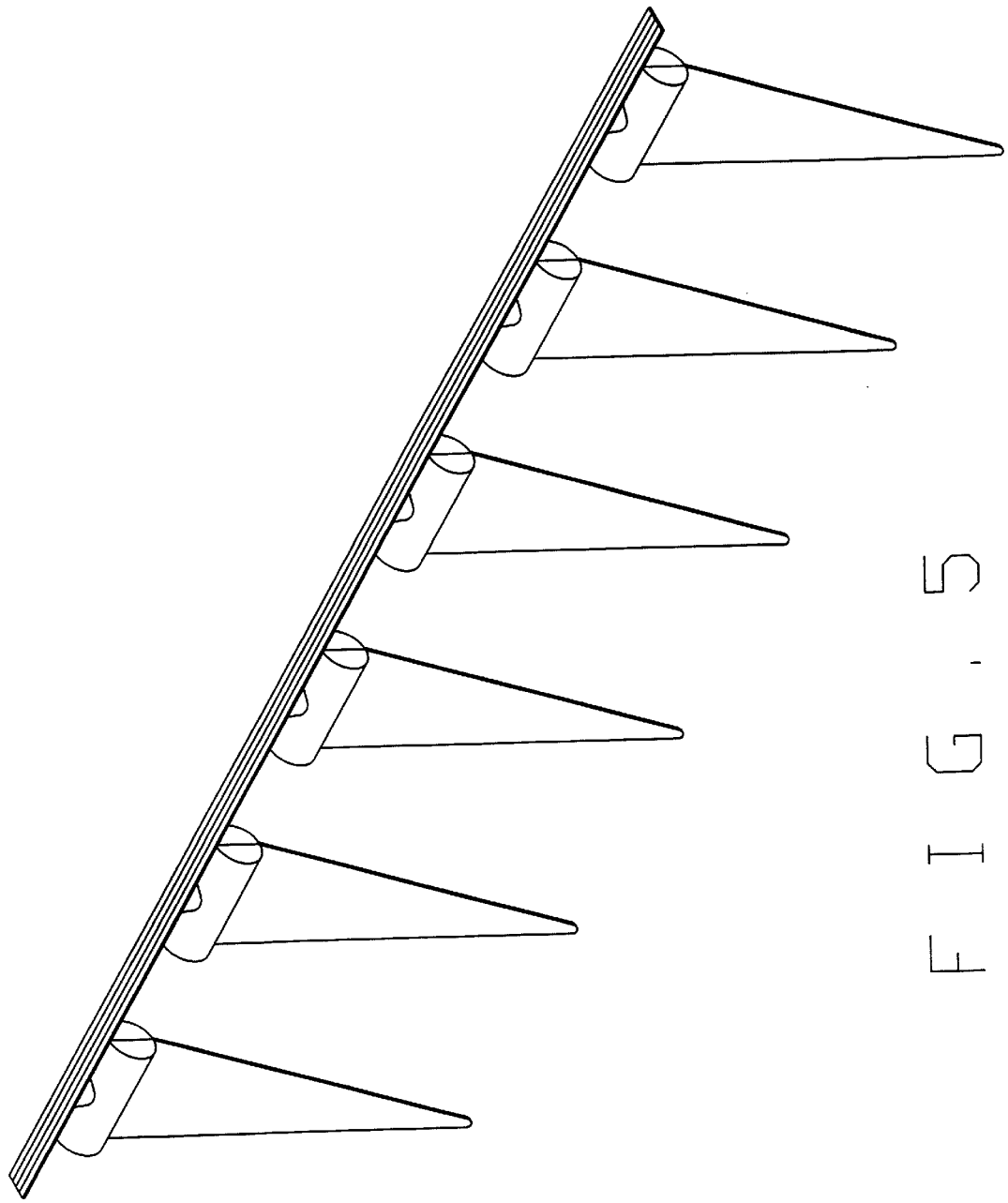
FIG. 5 is a perspective view showing the operation of the first embodiment of the present invention.

Referring to FIGS. 1, 2 and 5, the present invention comprises a parallel cable 10, a lamp-holder 11 coupled to the parallel cable 10 and holding a bulb therein. The parallel cable 10 can be attached on or hung on the inside or outside of a house or building.

A lamp box 20 is formed by a pair of hollow tube halves 201, a connecting piece 202 linking both tube halves 201 into an integral structure, a transparent banner 21 extending outwardly from the back side of the connecting piece 202, and some cooperating locking components formed on each open side of the lamp box 20. Locking components, like plugs 22 and sockets 23, or some other structures serving the same purpose, can be used so that the tube halves 201 can be closed and locked together. A couple of corresponding notches 24 formed in the top part of the open edges of each half 201 to snap on the lamp-holder 11 and thereby locating the hanging banner 21. In this way, hanging a banner 21 on a lamp-holder 11, many banners 21 can be linked into a serial flag string, as shown in FIG. 5.

Figure 3:
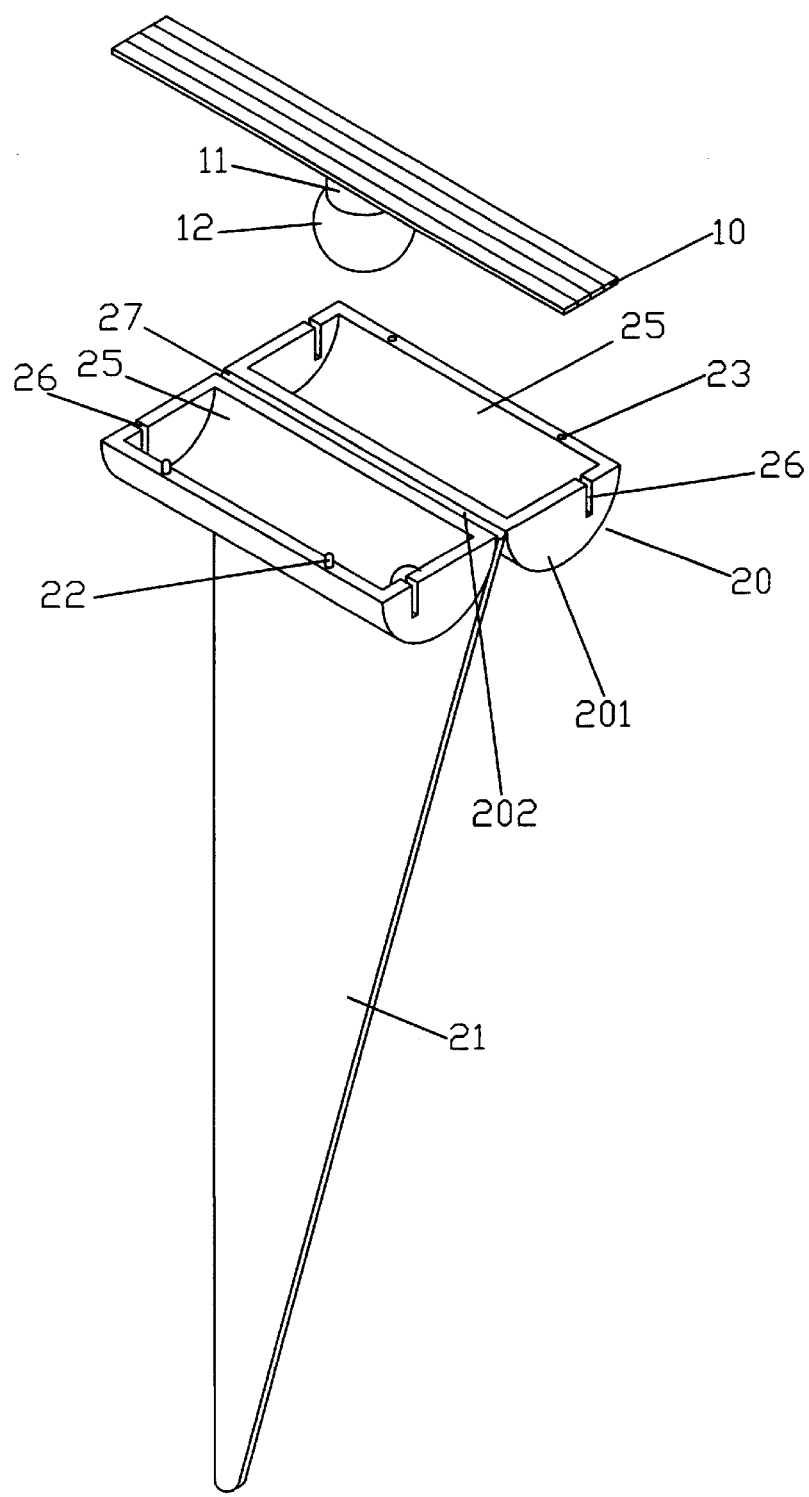
FIG. 3 is an exploded view showing another embodiment of the present invention.
Figure 4:
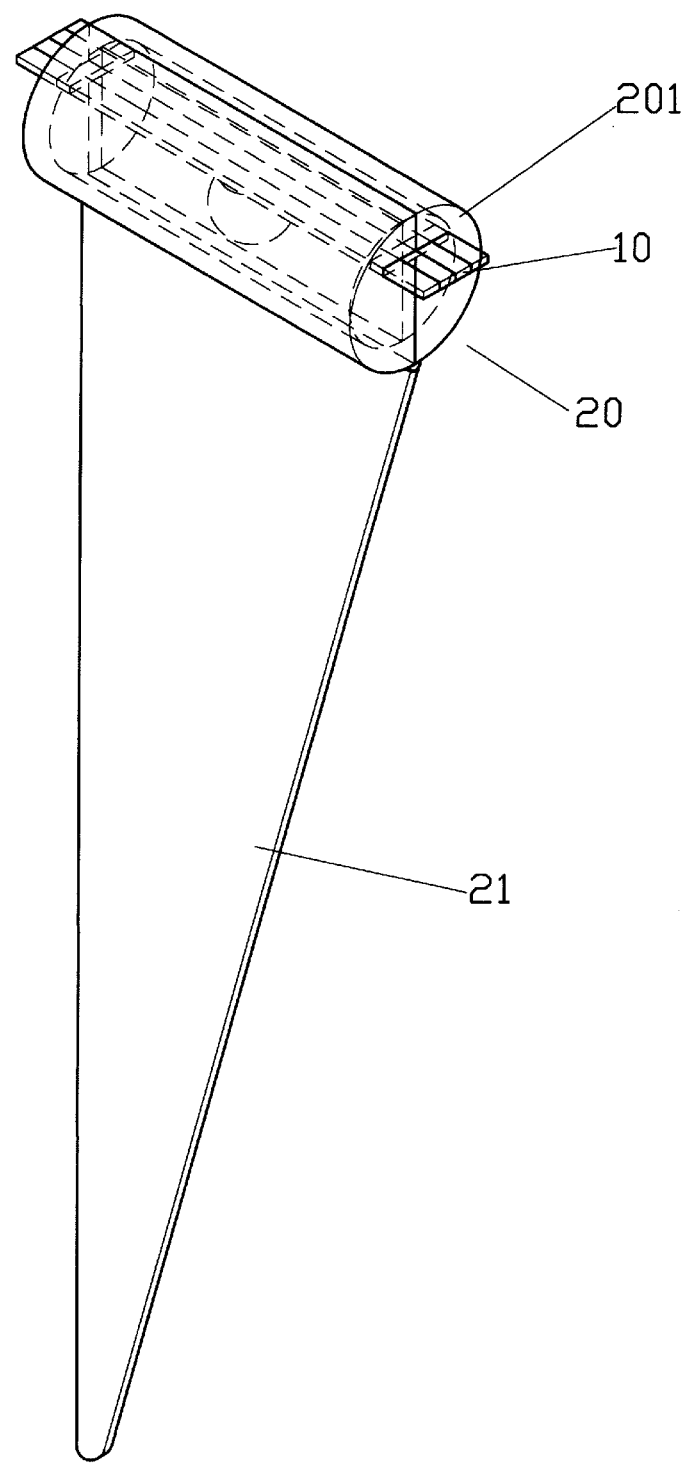
FIG. 4 is a perspective view of the embodiment of FIG. 3.

Referring to FIG. 3 and FIG. 4, another embodiment of the present invention provides a lamp box 20 holding onto the parallel cable 10 with the bulb 12 on the inside. The embodiment comprises a parallel cable 10, a lamp-holder 11 seated on the parallel cable 10 and holding a bulb 12 therein. The parallel cable 10 can be attached on or hung on the inside or outside of a house or building.

A lamp box 20 is formed by a pair of hollow tube halves 201, a connecting piece 202 linking both tube halves 201 into an integral structure, a transparent banner 21 extending outwardly from the back side of the connecting piece 202, and some cooperating locking components formed on each open side of the lamp box 20. Locking components, like plugs 22 and sockets 23, or some other structures serving the same purpose, can be used so that the halves 201 can be closed and locked together. A couple of corresponding slots 26 are formed in opposing ends of each tube half 201 for locating the parallel cable 10 therein for combination with the lighting system. In this way, a long parallel cable can accommodate many banners 21. The flag string can be hung up inside or outside of a house or building.

The lamp box 20 and the banner 21, of the present invention, are made from a transparent material and molded integrally. The inside wall of the lamp box 20 is coated with an electroplated layer 25 for improving the reflectivity thereof, except for the connecting area between the banner 21 and the tube halves of the lamp box 20, to form a photic zone 27, in order to conduct light rays to the banner 21. By means of the reflection of the electroplated layer 25, the light rays emitted by the bulb 12 are condensed on the inside of the lamp box 20. Then, via the photic zone 27 the condensed light rays are conduced into the banner 21, so as to make the banner emit light to brighten the words or pictures on the banner 21, especially at night to make advertising or notices eye-catching.

I claim:

1. An electrolier flag comprising:

a parallel cable;

a lamp-holder coupled to the parallel cable and having a bulb mounted therein; and, a lamp box formed by a pair of hollow tube halves joined together by a connecting piece, and a transparent banner extending from one side of the connecting piece, the pair of tube halves having a respective pair of corresponding notches formed in a top part of respective open edges thereof, so that the notches of the pair of tube halves snap on to the lamp-holder for locating the transparent banner.

2. An electrolier flag, comprising:

a parallel cable;

a lamp-holder coupled to the parallel cable and having a bulb mounted therein; and, a lamp box formed by a pair of hollow tube halves joined together by a connecting piece, and a transparent banner extending from one side of the connecting piece, the pair of tube halves each having a pair of opposing ends with a pair of corresponding slots respectively formed therein for locating the parallel cable therein and thereby locate the transparent banner.

* * * * *